(12) United States Patent
Jiddou

(10) Patent No.: US 7,796,972 B2
(45) Date of Patent: Sep. 14, 2010

(54) METHOD AND SYSTEM FOR AUTOMATIC CALLING UNIT REPLENISHMENT

(75) Inventor: Nada S. Jiddou, West Bloomfield, MI (US)

(73) Assignee: General Motors LLC, Detroit, MI (US)

( * ) Notice: Subject to any disclaimer, the term of this patent is extended or adjusted under 35 U.S.C. 154(b) by 284 days.

(21) Appl. No.: 12/130,557

(22) Filed: May 30, 2008

(65) Prior Publication Data

US 2008/0287097 A1    Nov. 20, 2008

Related U.S. Application Data

(63) Continuation of application No. 10/607,657, filed on Jun. 27, 2003, now Pat. No. 7,382,873.

(51) Int. Cl.
*H04M 15/00* (2006.01)
*H04M 11/00* (2006.01)

(52) U.S. Cl. ............... 455/405; 379/114.16; 379/114.2; 455/407

(58) Field of Classification Search ............ 379/114.01, 379/114.09, 114.16, 114.17, 114.2, 130, 379/131, 144.01; 455/405–408, 410–411, 455/550.1, 575.9
See application file for complete search history.

(56) References Cited

U.S. PATENT DOCUMENTS

| | | | |
|---|---|---|---|
| 6,320,947 B1 * | 11/2001 | Joyce et al. | 379/114.2 |
| 6,330,499 B1 | 12/2001 | Chou et al. | |
| 6,381,316 B2 * | 4/2002 | Joyce et al. | 379/114.2 |
| 6,532,282 B1 | 3/2003 | Plush et al. | |
| 6,546,243 B2 | 4/2003 | Tiedemann, Jr. et al. | |
| 6,556,840 B2 | 4/2003 | Zicker et al. | |
| 6,604,033 B1 | 8/2003 | Banet et al. | |
| 6,611,740 B2 | 8/2003 | Lowrey et al. | |
| 6,686,880 B1 | 2/2004 | Marko et al. | |
| 6,707,421 B1 | 3/2004 | Drury et al. | |
| 6,714,632 B2 * | 3/2004 | Joyce et al. | 379/114.2 |
| 6,907,113 B1 * | 6/2005 | Holm et al. | 379/88.23 |
| 6,941,134 B2 | 9/2005 | White | |
| 6,960,990 B2 | 11/2005 | McKibbon | |
| 6,965,326 B2 | 11/2005 | Allison | |
| 7,010,289 B2 | 3/2006 | Jijina et al. | |
| 7,194,073 B2 | 3/2007 | Watkins et al. | |
| 7,305,234 B1 * | 12/2007 | White | 455/418 |
| 7,308,087 B2 * | 12/2007 | Joyce et al. | 379/114.2 |
| 7,313,382 B2 * | 12/2007 | Wang | 455/405 |
| 7,643,623 B2 * | 1/2010 | Cai | 379/114.16 |

(Continued)

*Primary Examiner*—Binh K Tieu
(74) *Attorney, Agent, or Firm*—Dierker & Associates, P.C.

(57) ABSTRACT

A method for automatically replenishing vehicle calling units is disclosed herein. The method includes selecting, in response to a user input, a call unit rate plan including parameters designating automatic replenishment of calling units for loading into a telematics unit. A calling plan configuration signal is transmitted to the telematics unit, where the calling plan configuration signal is indicative of the selected call unit rate plan parameters. The telematics unit is configured with the selected call unit rate plan parameters. A current cycle of the rate plan is monitored, via the telematics unit, for its expiration; and the telematics unit determines whether an additional cycle is available in a plan duration upon expiration of the current cycle. If the additional cycle is available, the telematics unit automatically replenishes the calling units to a number of calling units available per cycle upon the expiration of the current cycle.

15 Claims, 2 Drawing Sheets

U.S. PATENT DOCUMENTS

| | | |
|---|---|---|
| 2002/0115436 A1 | 8/2002 | Howell et al. |
| 2002/0174360 A1 | 11/2002 | Ikeda |
| 2003/0008365 A1* | 1/2003 | Yu et al. .................... 435/183 |
| 2003/0139173 A1 | 7/2003 | Mazzara et al. |
| 2003/0143976 A1 | 7/2003 | Wang |
| 2003/0162525 A1 | 8/2003 | Stefan et al. |
| 2003/0188303 A1 | 10/2003 | Barman et al. |
| 2003/0210159 A1 | 11/2003 | Arunkumar |
| 2003/0217002 A1 | 11/2003 | Enborg |
| 2004/0001578 A1* | 1/2004 | Van Tonder ............ 379/114.01 |
| 2004/0023647 A1 | 2/2004 | Mazzara et al. |
| 2004/0044454 A1 | 3/2004 | Ross et al. |
| 2004/0054444 A1 | 3/2004 | Abeska et al. |
| 2004/0133511 A1* | 7/2004 | Smith et al. .................. 705/39 |
| 2004/0142659 A1 | 7/2004 | Oesterling |
| 2004/0203692 A1 | 10/2004 | Schwinke et al. |
| 2004/0203696 A1 | 10/2004 | Jijina et al. |
| 2004/0224661 A1 | 11/2004 | Pericas et al. |
| 2004/0259524 A1 | 12/2004 | Watkins et al. |
| 2004/0266392 A1 | 12/2004 | Jiddou |
| 2005/0017851 A1 | 1/2005 | Allison |
| 2005/0027438 A1 | 2/2005 | Rockett et al. |
| 2005/0100148 A1 | 5/2005 | Watkins et al. |
| 2005/0137763 A1 | 6/2005 | Watkins et al. |
| 2005/0201545 A1 | 9/2005 | Rockett et al. |
| 2005/0216903 A1 | 9/2005 | Schaefer |
| 2005/0232086 A1 | 10/2005 | Jiddou et al. |
| 2005/0288827 A1 | 12/2005 | Watkins |
| 2008/0063161 A1* | 3/2008 | Joyce et al. ............... 379/114.2 |

* cited by examiner

METHOD AND SYSTEM FOR AUTOMATIC CALLING UNIT REPLENISHMENT

CROSS-REFERENCE TO RELATED APPLICATION

This application is a continuation of U.S. patent application Ser. No. 10/607,657, filed Jun. 27, 2003, which is incorporated herein by reference in its entirety.

FIELD OF THE INVENTION

This invention relates generally to data transmission over a wireless communication system. More specifically, the invention relates to a method and system for replenishing cellular phone calling units.

BACKGROUND OF THE INVENTION

Many passenger vehicles now incorporate an integrated communication system. A Vehicle Communication Unit (VCU) used in conjunction with a Wide Area Network (WAN) such as a cellular telephone network or a satellite communication system allows for a variety of fee-based subscription services to be provided in a mobile environment. One such service provides for the use of a wireless phone within the vehicle. Users of these services find them convenient and at times a lifesaver in emergency situations.

One drawback to these fee-based subscription services, however, is the subscription cost which, at times, can be quite high. The cost of a plan may be based on many factors. The cost may be based on such factors as, for example, the total number of months duration of the plan, the number of minutes allowed per month, and the time of day a call is placed. Fortunately, service providers have a wide variety of plans available to suit most consumers' budgets.

A problem arises, though, when the subscriber uses the cellular phone for more than the amount of minutes allotted for a particular billing cycle. Depending on the service provider and other billing factors, the cost for these additional minutes can be very high. For example, a service provider may offer a plan where the cost is under one cent per minute. However, the cost per minute over the plan limit may be twenty-five cents or more. For most situations staying within the allotted number of minutes is not a problem. However, the probability of incurring additional fees is high for those who may travel extensively or who use the cellular phone for work. Excessive fees may also be a problem for parents that provide a cellular phone to their talkative children.

Some cellular phone providers offer inconvenient solutions to these problems. One solution provided is a prepaid cellular phone with a finite number of minutes, that upon their use the phone will not function. Another option is a calling card, also with prepaid minutes. Calling cards provide an inconvenient solution due to the requirement that the user must input a long string of digits that corresponds to the calling card and then the telephone number of the party they are trying to contact. Further, calling cards are easily lost or misplaced.

It would be desirable, therefore, to provide a system and method for replenishing calling units to a cellular phone that overcomes these and other disadvantages.

SUMMARY OF THE INVENTION

A method for automatically replenishing vehicle calling units is disclosed herein. The method includes selecting, in response to a user input, a call unit rate plan including parameters designating automatic replenishment of calling units for loading into a telematics unit. A calling plan configuration signal is transmitted to the telematics unit, where the calling plan configuration signal is indicative of the selected call unit rate plan parameters. The telematics unit is configured with the selected call unit rate plan parameters. A current cycle of the rate plan is monitored, via the telematics unit, for its expiration; and the telematics unit determines whether an additional cycle is available in a plan duration upon expiration of the current cycle. If the additional cycle is available, the telematics unit automatically replenishes the calling units to a number of calling units available per cycle upon the expiration of the current cycle.

DETAILED DESCRIPTION

Figure 1:
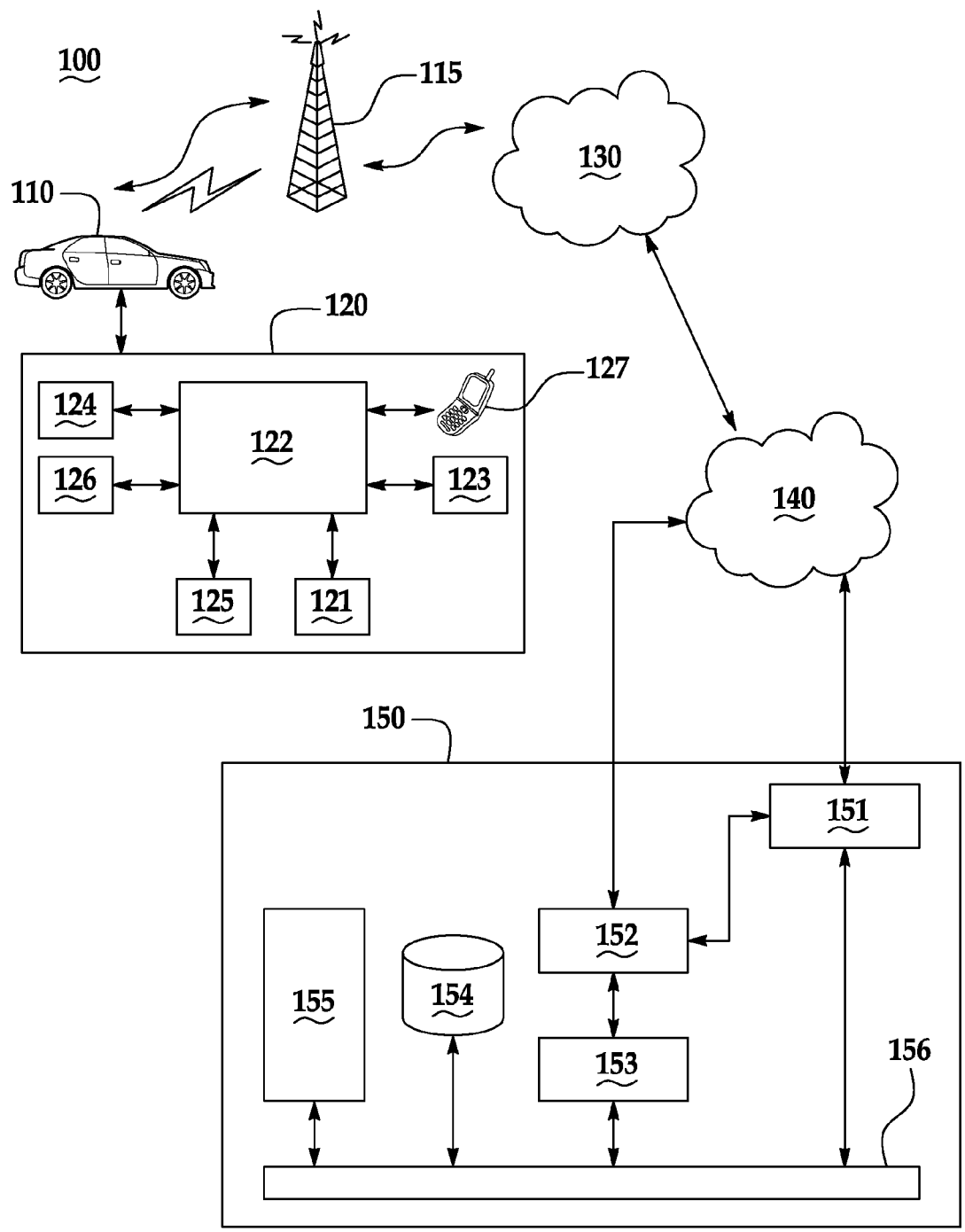
FIG. 1 is an illustration of one embodiment of a system for replenishing cellular phone calling units in a mobile vehicle, in accordance with the current invention.

FIG. 1 shows an illustration of one embodiment of a system for replenishing cellular phone calling units in a mobile vehicle, in accordance with the present invention at 100. Cell-phone unit replenishment system 100 may use current hardware within telecommunication systems and networks that are enabled by code division multiple access technology (CDMA), but implement new software applications and methods to replenish cellular phone calling units.

Cell-phone unit replenishment system 100 contains one or more mobile vehicles 110, one or more telematics units 120, one or more wireless carrier systems 115 of a wireless service provider, one or more communication networks 130, one or more land networks 140, and one or more call centers 150. Call center 150 includes one or more switches 151, one or more data transmission devices 152, one or more communication services managers 153, one or more communication services databases 154, one or more advisors 155, and one or more bus systems 156.

Mobile vehicle 110 is a vehicle equipped with suitable hardware and software for transmitting and receiving voice and data communications. Mobile vehicle 110 contains telematics unit 120. Telematics unit 120 may include a digital signal processor (DSP) 122 connected to a wireless analog, digital or dual-mode modem 124, a global positioning system (GPS) unit 126, an in-vehicle memory 125, a microphone 121, one or more speakers 123, and a wireless communication device 127. Wireless communication device 127 may be an in-vehicle mobile (cellular) phone. In-vehicle mobile phone 127 may be an analog, digital, or dual-mode cellular phone.

DSP 122 uses instructions and data from a computer usable medium that contains various computer programs for controlling programming and operational modes within mobile vehicle 110. Digital signals activate programming and operational modes, as well as provide input and output data. DSP 122 may direct communications from the telematics unit 120 through mobile phone 127.

Telematics unit 120 contains an in-vehicle wireless communication device such as a digital mobile or cellular phone 127 with suitable hardware and software for transmitting and receiving data communications. Mobile phone 127 may be a CDMA-enabled, TDMA-enabled, or GSM-enabled communication device. Mobile vehicle 110 sends to and receives radio transmissions from wireless carrier system 115. Mobile vehicle 110 may also contain a central processing unit (CPU), a controller, a microcontroller, or a host processor with software and additional hardware to enable communications with the mobile vehicle and to perform other routines and requested services.

In one embodiment, wireless carrier system 115 may be a wireless communications carrier. Wireless carrier system 115 may be, for example, a mobile telephone system or station. The mobile telephone system may be a digital mobile telephone system operating over a prescribed band nominally at 800 MHz, 900 MHz, 1900 MHz, or any suitable band capable of carrying mobile communications. The wireless vehicle communication device may be enabled by code division multiple access technology (CDMA) with greater call capacity than narrowband multiple access wireless technologies. Wireless carrier system 115 transmits to and receives signals from mobile vehicle 110. Wireless carrier system 115 may also transmit to and receive signals from a second mobile vehicle 110. Wireless carrier system 115 may be connected with communications network 130.

Communications network 130 comprises a mobile switching center (MSC), also known as a mobile telephone switching office (MTSO). Communications network 130 comprises services from one or more wireless communications companies. Communications network 130 includes any suitable system or collection of systems for connecting wireless carrier system 115 to a second mobile vehicle 110 or to a call center. In one embodiment, land network 140 is a public-switched telephone network. Land network 140 may be comprised of a wired network, an optical network, a fiber network, another wireless network, or any combination thereof. Land network 140 comprises an Internet protocol (IP) network. Land network 140 connects communications network 130 to a call center.

In one embodiment, land network 140 connects a first wireless carrier system 115 with a second wireless carrier system 115. Communication network 130 and land network 140 may connect wireless carrier system 115 to a communication node or call center 150.

Call center 150 may be a location where many calls may be received and serviced at the same time, or where many calls may be sent at the same time. Alternatively, call center 150 may be a telematics service call center, prescribing communications to and from mobile vehicles 110. The call center may be a voice call center, providing verbal communications between an advisor in the call center and a subscriber in a mobile vehicle. In one embodiment, the call center contains each of these functions to provide requested subscriber services.

These services include, but are not limited to enrollment services, navigation assistance, directory assistance, roadside assistance, business or residential assistance, information services assistance, emergency assistance, and communications assistance. Telematics service call center 150 may also manage personal calling plans negotiated with local wireless carrier providers in the home area of a driver.

The call center 150 contains switch 151. Switch 151 is connected to land network 140, and may receive a modem carrier signal from an analog modem or from a digital modem. Switch 151 transmits voice or data transmission from the communication node and may also receive voice or data transmissions from mobile vehicle 110 through wireless carrier system 115, communications network 130, and land network 140. Further, switch 151 receives from or sends data transmissions to data transmission device 152. Switch 151 may also receive from or send voice transmissions to advisor 155 via bus system 156.

Data transmission device 152 sends or receives data from switch 151. Data transmission device 152 may be an IP router or a modem. Data transmission device 152 may transfer data to or from advisor 155, one or more communication services managers 153, one or more communication services databases 154, and any other device connected to bus system 156. Data transmission device 152 also conveys information received from land network 140 to communication services manager 153. Communication services manager 153 is connected to switch 151, data transmission device 152, and advisor 155 through bus system 156. The call center includes any combination of hardware or software facilitating data transmissions between call center 150 and mobile vehicle 110.

Communication services manager 153 receives information from mobile vehicle 110 through wireless carrier system 115, communication network 130, land network 140, and data transmission device 152. Communication services manager 153 may send information to mobile vehicle 110 through data transmission device 152, land network 140, communication network 130 and wireless carrier system 115. Communication services manager 153 may also determine whether a communication should be sent to mobile vehicle 110, provide further requests and determinations based on a reply from mobile vehicle 110 and provide information to mobile vehicle 110 from communication services database 154.

Communication services database 154 contains records on one or more mobile vehicles 110. Records in communication services database 154 may include vehicle identification, location information, status information, and recent action information regarding mobile vehicle 110. Communication services database 154 provides information and other support to communication services manager 153.

Advisor 155 may be a real advisor or a virtual advisor. A real advisor is a human being in verbal communication with mobile vehicle 110. A virtual advisor is a synthesized voice interface responding to requests from mobile vehicle 110. Advisor 155 provides services to mobile vehicle 110. Advisor 155 may communicate with communication services manager 153 or any other device connected to bus system 156.

Figure 2:
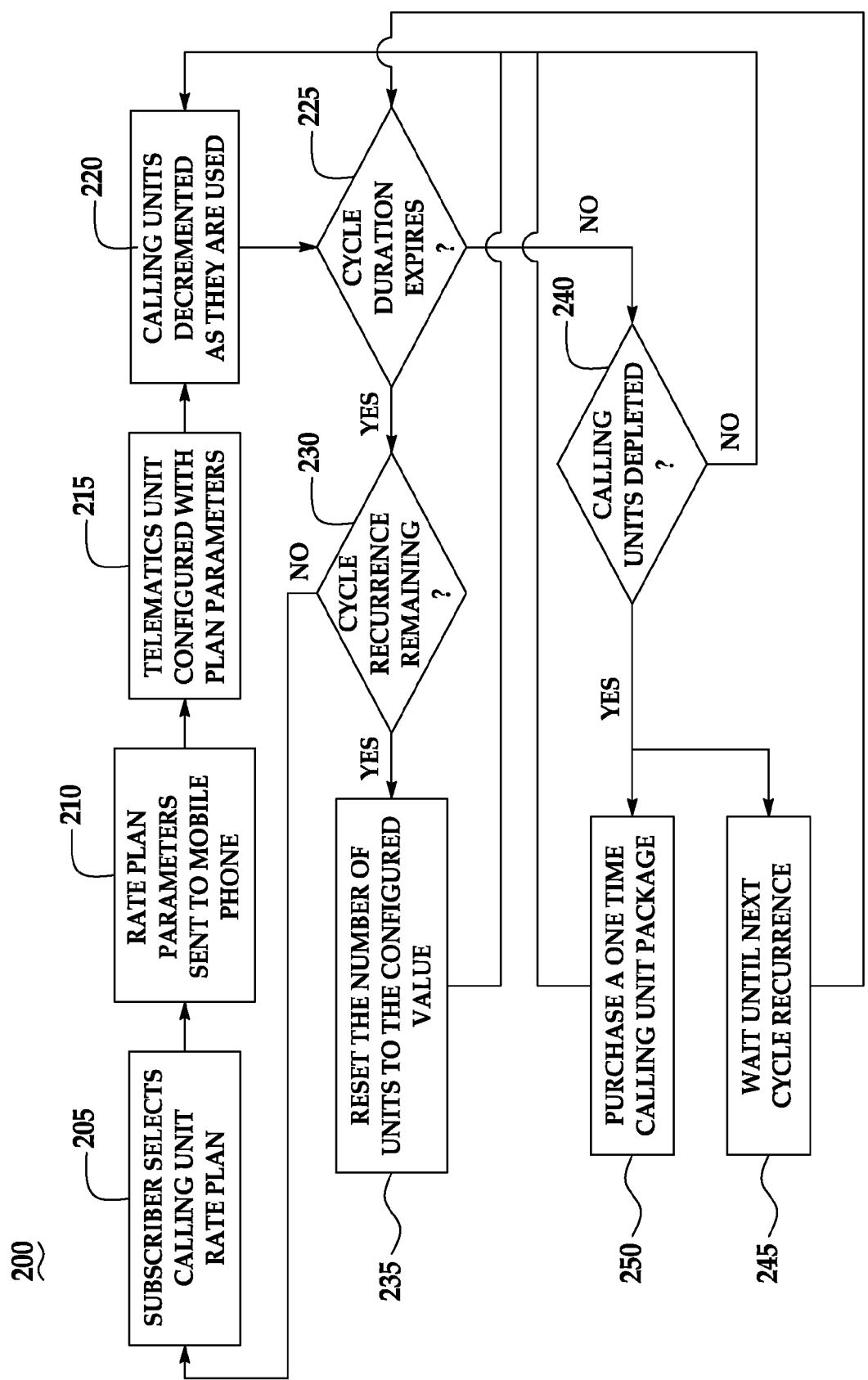
FIG. 2 is a flow diagram of one embodiment of a method for replenishing cellular phone calling units in a mobile vehicle, in accordance with the current invention.

FIG. 2 shows a flow diagram of one embodiment of a method for replenishing calling units for a wireless communication device in accordance with the present invention and shown generally at 200. In the preferred embodiment, method 200 utilizes a system like that described in FIG. 1.

Method 200 begins when a subscriber contacts the call center 150 and selects a calling unit rate plan (Block 205). The subscriber may contact call center 150 by phone, the Internet or any other method known in the art.

A calling unit rate plan provides the details of the cellular phone subscription service the subscriber selects. The calling unit rate plan includes several parameters for the subscriber to define. In one embodiment, these parameters include the duration of the plan, the number of cycles the duration is divided into and the number of calling units per cycle. These parameters comprise a calling plan termination configuration whereby upon the expiration of the duration or the depletion of the calling units, the calling plan is terminated. In another embodiment, a rollover parameter may be defined. This parameter comprises choosing whether any unused calling units will rollover into the next cycle. As an example, the subscriber may choose a plan having a duration of one year, the duration divided into twelve cycles (recurrences) and 200 calling units (minutes) per cycle. The subscriber may also choose to have any minutes left at the end of a cycle to rollover into the next cycle.

Once the plan is selected, a calling plan configuration signal is sent to the telematics unit 120 of vehicle 110 (Block 210). The calling plan configuration signal includes data regarding the calling unit rate plan parameters. Once received, the calling plan configuration signal is then used to configure the telematics unit hardware with the selected parameters (Block 215). The number of calling units are stored in memory 125 located within the telematics unit. Referring to the above example, the subscriber's cellular phone is now configured for a plan duration of 12 months, the duration divided into one-month cycles with a limit of 200 minutes in each one-month cycle.

As the calling units are used the telematics unit 110 will decrement the available calling units and store the remaining available calling units in memory (Block 220). The configured telematics software will also determine whether or not the duration of the current cycle has expired (Block 225). If the current cycle has expired the telematics unit software will determine whether there is a remaining cycle recurrence (Block 230). If there is at least one remaining cycle, the telematics unit will reset the number of available calling units to the configured value (Block 235) and return to Block 220. If it is determined that there are no remaining cycles (i.e. the duration of the plan has expired), the subscriber will be prompted to contact the calling center to select a calling unit rate plan (Block 205). In another embodiment, the subscriber may be given the option of purchasing a one time calling unit package. The one time unit package would allow the subscriber the ability to continue using the cellular phone and to contact the call center at a later time to select another calling unit plan.

If, at Block 225, the system determines that the cycle duration has not expired, the system determines whether the calling units are depleted (Block 240). If the units have not been depleted, the method returns to Block 220. If the units have been depleted but the cycle duration has not expired, the subscriber is given the choice to purchase a one-time calling unit package (Block 250) or wait until the start of a new cycle (Block 245).

In another embodiment of the method illustrated in FIG. 2 any remaining calling units at the end of a cycle may be rolled over to the next cycle. The remaining minutes are stored in memory located in the telematics unit. In one embodiment, these minutes are stored in a location separate from the minutes allocated for a new cycle and are depleted before the new amount of minutes are used. In another embodiment, the rolled over minutes are added to the newly allocated minutes with no distinction made between the minutes. For example, if at the end of a 200 minute per month cycle there remains 10 minutes, the remaining 10 minutes are added to the newly allocated 200 minutes made available at the beginning of the new cycle resulting in a total of 210 minutes available for the new cycle.

In another embodiment, the method does not allow for the purchase of a one time calling unit package, causing the subscriber to wait for unit replenishment at the start of a new cycle. This method may be attractive to parents who wish for their children to have a mobile phone when they are driving but without the worry that the child would use the phone beyond the allotted number of minutes per cycle.

In yet another embodiment, the cellular phone is not linked to a telematics unit of a vehicle. In this embodiment a cellular phone includes the necessary hardware and software for implementing a method for replenishing calling units as that described above in FIG. 2.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for automatically replenishing vehicle calling units, comprising:
   selecting, in response to a user input, a call unit rate plan including parameters designating automatic replenishment of calling units for loading into a telematics unit;
   transmitting a calling plan configuration signal to the telematics unit, the calling plan configuration signal being indicative of the selected call unit rate plan parameters;
   configuring the telematics unit with the selected call unit rate plan parameters;
   monitoring, via the telematics unit, a current cycle of the rate plan for its expiration;
   determining, via the telematics unit, whether an additional cycle is available in a plan duration upon expiration of the current cycle; and
   if the additional cycle is available, automatically replenishing, via the telematics unit, the calling units to a number of calling units available per cycle upon the expiration of the current cycle.

2. The method as defined in claim 1 wherein the call unit rate plan parameters include the plan duration, a number of cycles per the plan duration, and the number of calling units per cycle.

3. The method as defined in claim 2 wherein configuring the telematics unit with the selected call unit rate plan parameters includes:
   setting a plan expiration date based on the selected plan duration;
   setting a cycle expiration date for each cycle of the plan duration; and
   setting the number of calling units for a first cycle.

4. The method as defined in claim 1, further comprising decrementing the number of calling units available for the current cycle as the calling units are used during the current cycle.

5. The method as defined in claim 1 wherein automatically replenishing is accomplished at an expiration of each cycle throughout the plan duration.

6. The method as defined in claim 1, further comprising automatically rolling over unused calling units of the current cycle into a next cycle upon the expiration of the current cycle.

7. The method as defined in claim 1 wherein a call center selects the call unit rate plan in response to the user input, and wherein the call center transmits the calling plan configuration signal to the telematics unit.

8. A computer usable medium including a program for automatically replenishing vehicle calling units, comprising:
   computer program code for selecting, in response to a user input, a call unit rate plan including parameters designating automatic replenishment of calling units for loading into a telematics unit;
   computer program code for transmitting a calling plan configuration signal to the telematics unit, the calling plan configuration signal being indicative of the selected call unit rate plan parameters;

computer program code for configuring the telematics unit with the selected call unit rate plan parameters;

computer program code for monitoring a current cycle of the rate plan for its expiration;

computer program code for determining whether an additional cycle is available in a plan duration upon expiration of the current cycle; and computer program code for automatically replenishing the calling units to a number of calling units available per cycle upon the expiration of the current cycle if the additional cycle is available.

9. The computer usable medium as defined in claim 8 wherein the call unit rate plan parameters include the plan duration, a number of cycles per the plan duration, and the number of calling units per cycle, and wherein the computer program code for configuring the telematics unit with the selected call unit rate plan parameters includes:

computer program code for setting a plan expiration date based on the selected plan duration;

computer program code for setting a cycle expiration date for each cycle of the plan duration; and computer program code for setting the number of calling units for a first cycle.

10. The computer usable medium as defined in claim 8, further comprising computer program code for decrementing the number of calling units available for the current cycle as the calling units are used during the current cycle.

11. The computer usable medium as defined in claim 8, further comprising computer program code for automatically rolling over unused calling units of the current cycle into a next cycle upon the expiration of the current cycle.

12. A system for automatically replenishing vehicle calling units, comprising:

a call center configured to select, in response to a user input, a call unit rate plan including parameters designating automatic replenishment of calling units; and a telematics unit configured to i) receive, from the call center, a calling plan configuration signal that is indicative of the selected call unit rate plan parameters, ii) configure itself with the selected call unit rate plan parameters, iii) monitor a current cycle for its expiration, iv) determine whether an additional cycle is available in a plan duration upon expiration of the current cycle, and v) if the additional cycle is available, automatically replenish the calling units to a number of calling units available per cycle upon the expiration of the current cycle.

13. The system as defined in claim 12 wherein the call unit rate plan parameters include the plan duration, a number of cycles per the plan duration, and the number of calling units per cycle, and wherein the telematics unit is further configured to:

set a plan expiration date based on the selected plan duration;

set a cycle expiration date for each cycle of the plan duration; and set the number of calling units for a first cycle.

14. The system as defined in claim 12 wherein the telematics unit is further configured to decrement the number of calling units available for the current cycle as the calling units are used during the current cycle.

15. The system as defined in claim 12 wherein the telematics unit is further configured to automatically roll over unused calling units of the current cycle into a next cycle upon the expiration of the current cycle.

* * * * *